US005924238A

United States Patent [19]

Yanohara

[11] Patent Number: 5,924,238

[45] Date of Patent: Jul. 20, 1999

[54] APPARATUS FOR GROWING ORGANISMS BY MOIST AIR

[75] Inventor: Yoshitami Yanohara, Osaka, Japan

[73] Assignee: Kabushiki Kaisha Seibutu Kino Kogaku Kenkyusho, Osaka, Japan

[21] Appl. No.: 08/912,695

[22] Filed: Aug. 18, 1997

[30] Foreign Application Priority Data

Feb. 13, 1997 [JP] Japan .................................... 9-042889

[51] Int. Cl.[6] ............................ A01C 29/00; A01G 29/00

[52] U.S. Cl. ........................................................... 47/1.01 F

[58] Field of Search ............................................. 47/1.01 F

[56] References Cited

U.S. PATENT DOCUMENTS

| | | | |
|---|---|---|---|
| 4,462,184 | 7/1984 | Cunningham | 47/1.01 F |
| 5,282,873 | 2/1994 | Watari | 47/1.01 F |
| 5,306,317 | 4/1994 | Yoshizaki | 47/1.01 F |
| 5,433,759 | 7/1995 | Benson | 47/1.01 F |
| 5,507,595 | 4/1996 | Benson | 47/1.01 F |
| 5,590,980 | 1/1997 | Daniel | 47/1.01 F |
| 5,636,473 | 6/1997 | Benson | 47/1.01 F |

*Primary Examiner*—Michael J. Carone
*Assistant Examiner*—Joanne C. Downs
*Attorney, Agent, or Firm*—Nikaido, Marmeltein, Murray & Oram LLP

[57] ABSTRACT

The apparatus for growing organisms by moist air comprises the closed moistening tank having water therein, and the mixing chamber on the surface of said water, the nozzle and air pump for releasing air bubbles into the said water, the moist air outlet provided on the said mixing chamber, and the air feed tube connected with the said moist air outlet for passing the moist air into the culture medium.

Within the said mixing chamber, watery components are caused to adhere to the surfaces of ascending bubbles in the water. Mist is formed from the rupture of these bubbles, Adjustment is made for selecting the mist of small particle size. Then, there is prepared the moist air containing almost uniformly the mist of small particle size by a high pressurization within the said mixing chamber. Such moist air is caused to pass through the air feed tube in the form of a nearly laminar flow into the culture medium.

5 Claims, 3 Drawing Sheets

APPARATUS FOR GROWING ORGANISMS BY MOIST AIR

BACKGROUND OF THE INVENTION

The present invention relates to an apparatus for growing organisms such as plants and benthoses, etc. by putting moist air into a culture medium. The term "benthoses, etc." as used herein denotes "such benthoses as shellfishes, crabs, lugworms, etc. which live in the sand bottom of the sea or a lake, etc."

There has been known an apparatus for growing plants by moist air, which is provided with an air feed tube having a plurality of nozzles buried, in the culture medium on which plants are grown, a sprayer, and an air blower directly connected with one end of the air tube. Mist comprising water, and liquid fertilizer, etc. sprayed from the sprayer and air sent by the air blower are released into the cultured meduim from a plurality of nozzles of the air tube. Then, these are supplied to the roots of plants (Japanese Patent KOKAI No. 29/1994, published on Jan. 11, 1994).

However, this conventional apparatus for growing plants has disadvantages. When such an apparatus is used, mist and air are directly blown into the air feed tube in the form of a strong turbulent flow. The mist of large particles is blown into the feed tube in just the state that it is in. Thus, many water drops are formed within and on the air feed tube. These water drops eventually result in narrowing of the passage within the air feed tube, and thereby lower the feeding capacity of moist air. Furthermore, the uniform mixture of mist and air cannot be obtained within the narrow air feed tube. The volume of moist air released from each of the nozzles of the air feed tube is from time to time subject to change due to the strong turbulent flow. Thus, there is caused a problem that water, liquid fertilizer and oxygen cannot be supplied to plants as scheduled.

OBJECTS AND SUMMARY OF THE INVENTION

The object of the present invention is to provide an improved apparatus for growing organisms by moist air, which is capable of minimizing the formation of water drops within the air feed tube, and capable of supplying water and oxygen to organisms as scheduled.

Another object of the present invention is to provide an apparatus for growing plants by moist air, which is, capable of controlling the formation of water drops within the air feed tube and capable of supplying water and oxygen as scheduled.

A further other object of the present invention is to provide an apparatus for growing benthoses, etc., such as shellfishes, crabs, lugworms, etc. by moist air, which apparatus is capable of controlling the formation of water drops within the air feed tube and capable of supplying water and oxygen to the benthoses as scheduled.

These various objects may be, in short, realized by the present invention a having a specific moist air generating apparatus. The moist air generating apparatus comprises a closed moistening tank having water therein and having a closed high pressure mixing chamber defined in the tank over the surface of said water, an air bubble releasing means provided at the lower end of the moistening tank for releasing air bubbles into the water, and a moist air outlet provided on top of the mixing chamber and connected with the air feed tube extending into the culture medium.

The apparatus is capable of making an adjustment for selecting the mist of smaller particles from among those produced from the rupture of bubbles ascending in the water within the moistening tank, mixing the mist with air almost uniformly through a high pressurization within the mixing chamber, forming moist air containing mist of smaller particles almost uniformly and causing this moist air to pass through the air feed tube in the form of laminar flow. In this manner, the formation of water drops can be kept in a small quantity and simultaneously the moist air containing an almost uniform amount of water can be constantly released in a fixed quantity into the culture medium from nozzles of the air feed tube. Thus, organisms can be supplied with water and oxygen as scheduled.

There may be used, as the air bubble releasing means mentioned above, a nozzle having a plurality of pores, or a device made of solid material, having a plurality of pores, such as, for example, ceramics, metals, pumice, etc. in combination with an air pump or compressor, etc. for compressing and forcing a flow of such air thereinto.

DETAILED DESCRIPTION OF THE PREFERRED EMBODIMENTS

Figure 1:
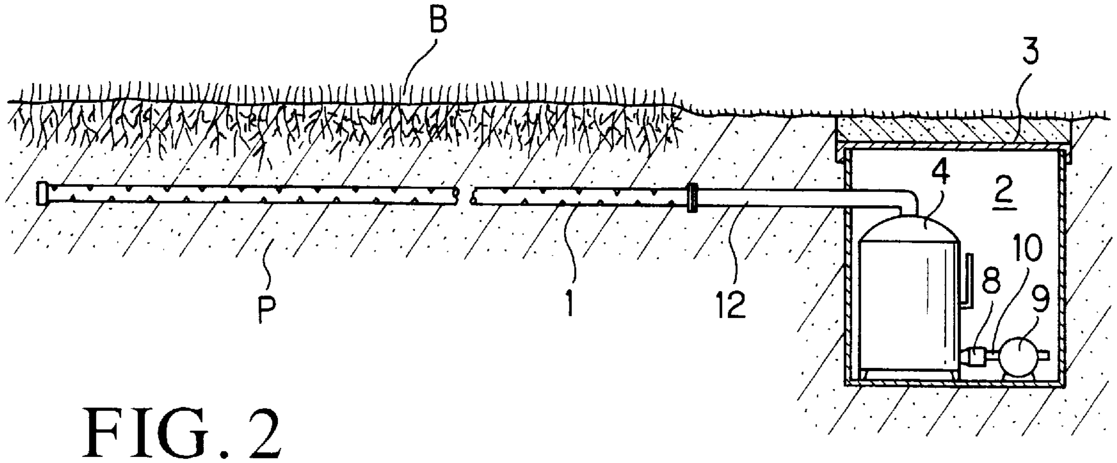
FIG. 1 is a view shown in cross section of the apparatus partially omitting some components thereof for growing green turf at a golf course or link, which is a first embodiment of the present invention.
Figure 2:
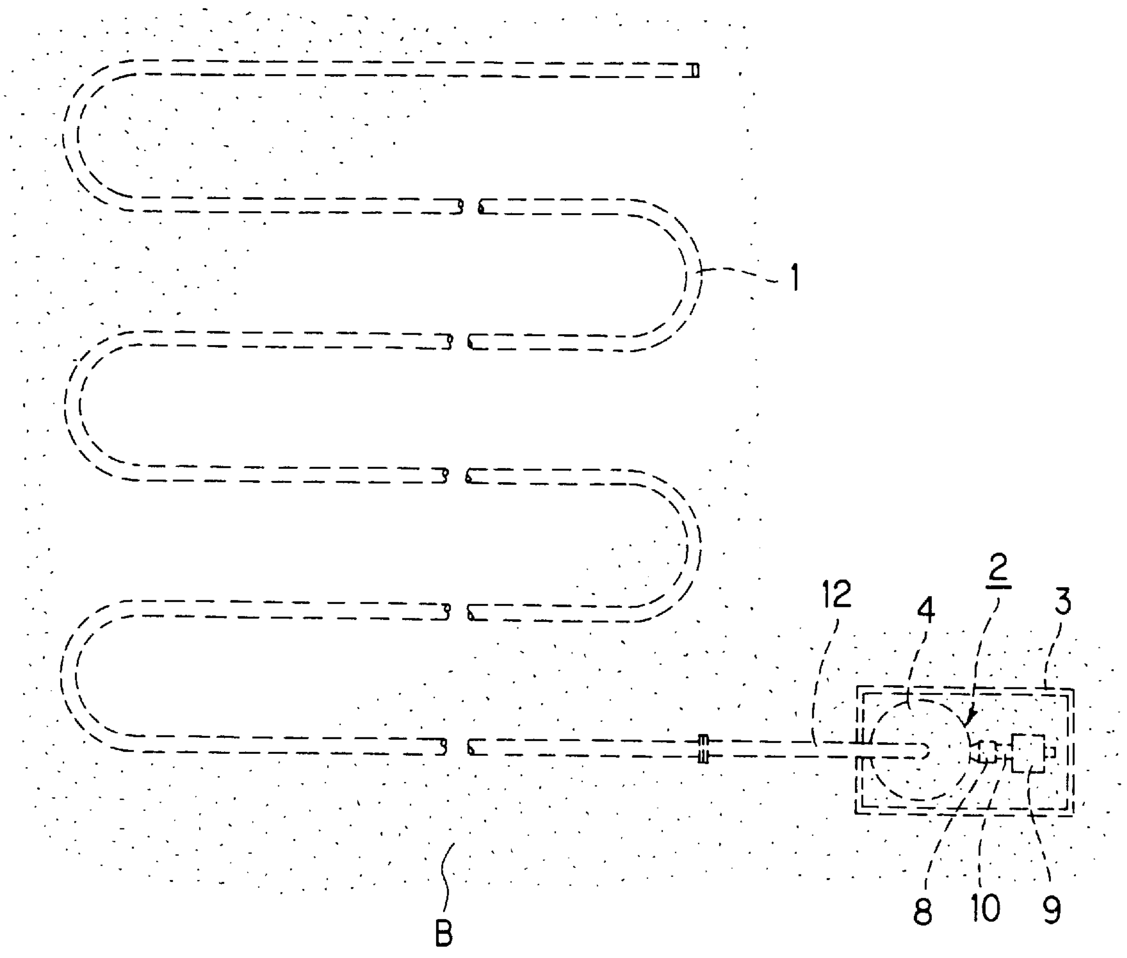
FIG. 2 is a plan view in cross section of the apparatus partially omitting some components thereof for growing green turf at golf course or link.

FIG. 1 and FIG. 2 show the apparatus for growing, by moist air, turf B on the putting green of a golf course or link according to the present invention. The culture medium P thereof comprises the ventilative mixture of soil with sand, gravel, etc.

An air feed tube 1 having a plurality of nozzles on its side wall is buried meanderingly, if viewed from above, about 15 centimeter deep in this culture medium P. The moist air generating apparatus 2 is connected with one end of the air feed tube 1. The other end of the air tube 1 is closed. The structure of the moist air generating apparatus 2 is as described below.

A closed quasi-cylindrical moistening tank 4 is positioned within a pit 3 provided with a lid capable of opening or closing, located away from the putting green.

Figure 3:
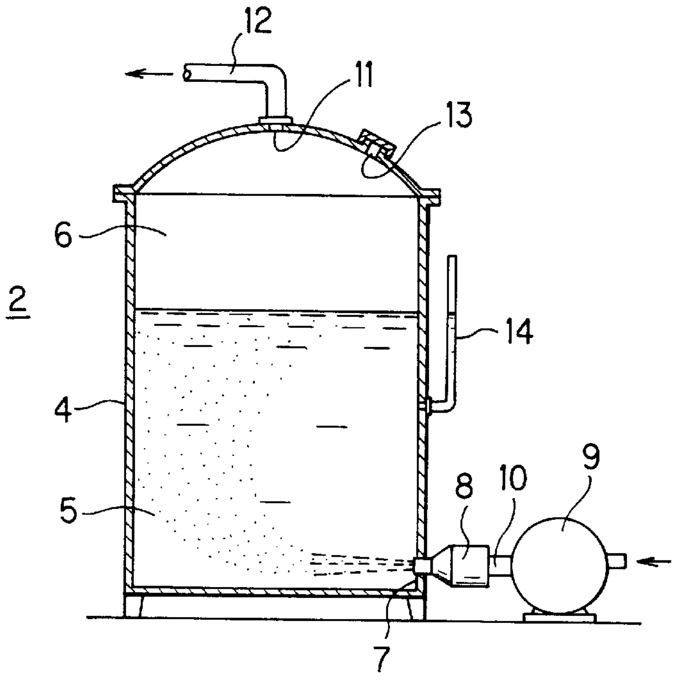
FIG. 3 is an enlarged view shown in cross section of the moist air generating apparatus.

As shown in FIG. 3, water 5 is filled to about ⅔ of the inside measurement of the moistening tank 4. A high pressure mixing chamber 6, i. e. the closed space in the top of the tank is formed after the surface of the water 5.

A bubble nozzle 8 having a plurality of pores has a releasing outlet directed into the water 5, and is connected through an opening 7 provided in the lower end of the side wall of the moistening tank 4.

An exhaust pipe 10 of an air pump 9 is connected with the rear end of the nozzle 8.

A small moist air outlet 11 is provided on the top of the moistening tank 4, namely on the upper center of the high pressure mixing chamber 6. The outlet 11 is connected with one end of the air feed tube 1 by way of a connecting tube 12.

An inlet 13 having a lid capable of opening or closing is provided on the top of the moistening tank 4. A tubular water gauge 14 is provided on the side wall of the moistening tank 4.

The operation of the apparatus is started with the drive of the air pump 9. Then, the air is forced by the air pump 9 and released, in the form of fine bubbles, into the water 5 within the moistening tank 4 through the bubble nozzle 8. Then these bubbles ascend in the water. While so doing, watery components are caused to adhere to the surfaces of bubbles in the form of a film. When the bubbles are released out of the water into the air within the mixing chamber 6, they are ruptured and the water film on the surface thereof is scattered and turns to mist. In such way, moist air containing mist is continually formed within the mixing chamber 6. In consequence of it, the air pressure is gradually raised within the mixing chamber 6. As the air pressure is raised within the mixing chamber 6, the air extends gradually into the air feed tube 1 through the outlet 11.

Now, mist of larger particle size out of those scattered within the high pressure mixing chamber 6 would descend and return to the water 5. Thus, only the mist of smaller particle size floats within the chamber. Further, at the initial stage of the mixture, the bubbles are ruptured in the lower space near the water surface within the mixing chamber 6, and mist and air are caused to travel in many directions. Further, as the pressure is raised within the mixing chamber 6, mist and air are thoroughly mixed with each other. Thereby, it follows that the moist air containing the mist of smaller particle size would stay almost uniformly in the upper space within the mixing chamber 6.

The moist air under a high pressure within the mixing chamber 6 is caused to pass into the air feed tube 1 through the outlet 11. Then, it is released into the culture medium P through each of the nozzles of the air feed tube 1. Thus, the roots of turf and aerobic microorganisms are supplied with oxygen and water. The remaining air is released above the ground through the culture medium P.

Since the moist air passing through the air feed tube 1 contains only the mist of small particle size and travels slowly in the form of a laminar flow, a small quantity of water drops has only to be formed within the air feed tube 1. Further, the moist air comprises an almost uniform mixture of mist and air and, under such condition, passes through the air feed tube 1 in the form of a laminar flow. Thus, the fixed quantity of the moist air containing the nearly uniform amount of moisture is released constantly from each of the nozzles.

Therefore, the caretaker of the turf B is, for example, able to predict the quantity of water and oxygen to be supplied to the roots of turf for their good growth, and calculate, based on this prediction, the operating time of the air pump 9 per day, and operate the air pump 9 following this finding. Thereby, it becomes possible to grow the turf as scheduled.

When necessary, various additions may be supplied to the culture medium the the moist air such as harmful organism repellents, biocides, fertilizers, and other various plant growth adjuvants.

The addition of adjuvants to the said moist air may be made by mixing the adjuvant in the form of aqueous solution with the water 5 of the moistening tank 4 or putting the same adjuvant in a gaseous form into the mixing chamber 6.

For example, earthworn repellent in a gaseous form can be put into the mixing chamber 6 through the inlet 13, prior to the operation of the air pump 9.

The earthworm repellent in gaseous form is released by the operation of the air pump 9 into the culture medium through the nozzles of the air feed tube 1 in combination with the moist air formed within the mixing chamber 6.

Figure 4:
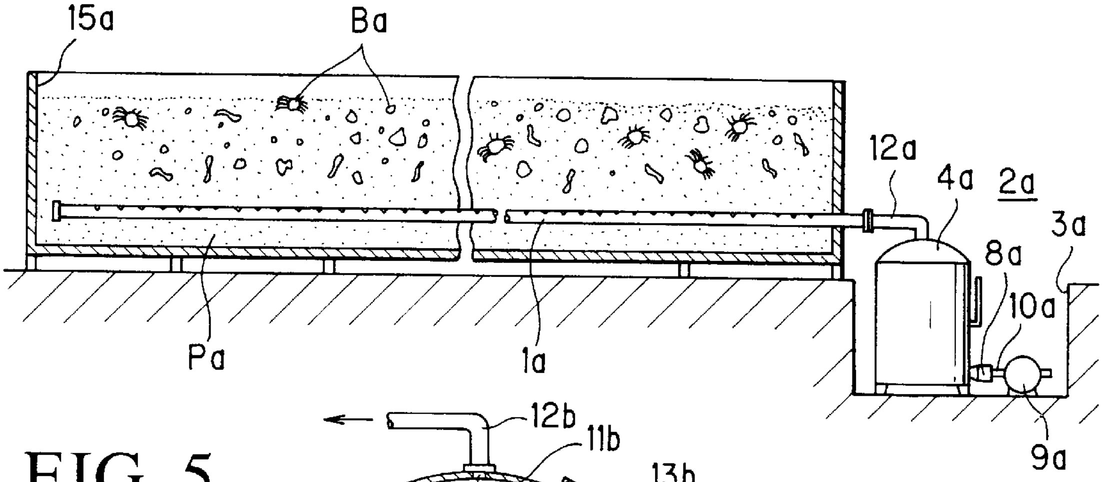
FIG. 4 is a view shown in cross section of the apparatus partially omitting some components thereof for growing benthoses, which is the second embodiment of the present invention.

Another embodiment shown in FIG. 4 is an apparatus for growing, by moist air, benthoses such as shellfishes, crabs, lugworms, etc. which live in the sand bottom of the sea or a lake. The benthoses Ba are allowed to stay in the culture medium Pa comprising sand within a growing container 15*a*.

The air feed tube 1*a* is connected with the moist air generating apparatus 2*a* the connecting tube 12*a*. The air feed tube 1*a* is buried near the bottom of the culture medium Pa within the said growing container 15*a*. The structures of other components are substantially the same as those of the first embodiment shown in FIGS. 1, 2, and 3.

To the apparatuses for growing plants as shown in FIG. 1 to 3, inclusive, and the apparatus for growing benthoses tending to live in the sand bottom of the sea or a lake as shown in FIG. 4, a heater and/or cooler, or heat pump provided with the combined functions of heating or cooling, may be added for heating or cooling the water within the moistening tank or air taken in by the air pump for the purpose of adjusting the temperature of warm moist air or cool moist air to be supplied to the culture medium according to the change of season.

Figure 5:
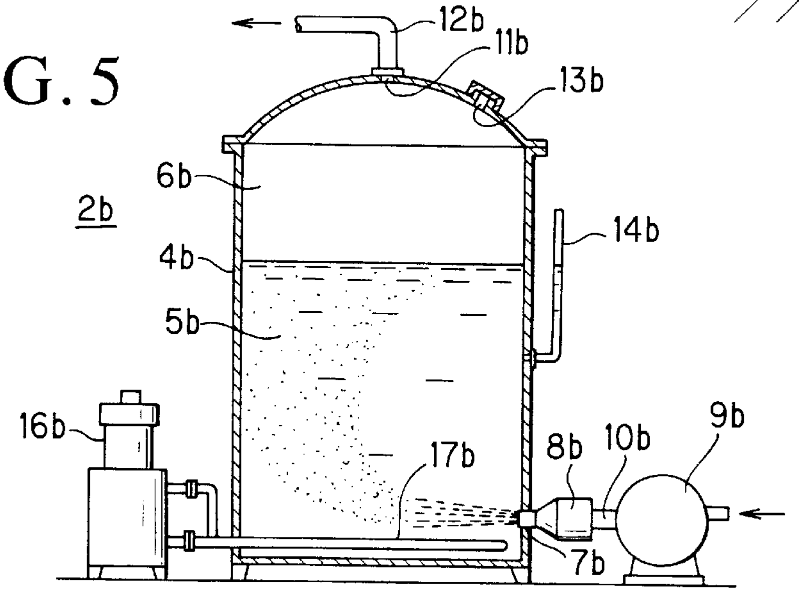
FIG. 5 is an enlarged view shown in cross section of a further embodiment of the moist air generating apparatus.

Such a moist air generating apparatus 2*b* is shown in FIG. 5. This apparatus comprises the tubular heat exchanger 17*b* connected with heat pump 16*b* and positioned in the water 5*b* of the moistening tank 4*b*. The structures of other components are substantially the same as shown in FIGS. 1 to 3, inclusive.

Figure 6:
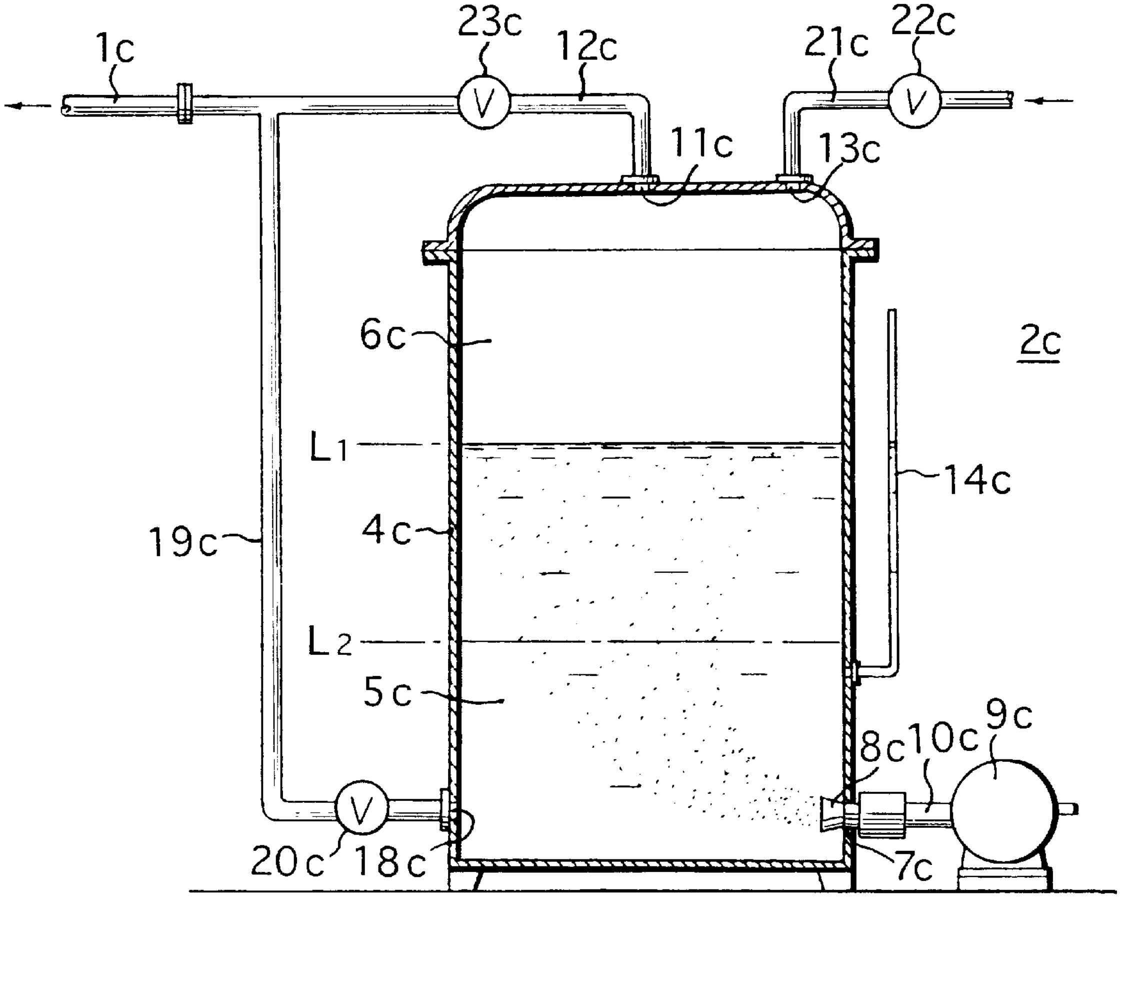
FIG. 6 is an enlarged view partially shown in cross section of a still further embodiment of the moist air generating apparatus.

FIG. 6 shows a further embodiment of the moist air generating apparatus 2*c* suitable for a dry season, which apparatus is used for the apparatus for growing the turf on the golf course. Reference is made to the structure of this embodiment. A water outlet 18*c* is additionally provided on the lower part of the side wall of the moistening tank 4*c*. The water outlet 18*c* is connected with one end of the air feed tube 1*c* by a connecting tube 19*c* having therein an electromagnetic valve 20*c*. Further, the inlet 13*c* on the top of the moistening tank 4*c* is connected with one end of the water supply tube 21*c* having therein an electromagnetic valve 22*c*. The other end of the water supply tube 21*c* is connected with the water service or a water supply pump. The connecting tube 12*c* is provided with an electromagnetic valve 23*c*. Other parts of the present apparatus are substantially the same, in terms of its structure, as those of the apparatuses shown in FIGS. 1, 2 and 3.

Referring to the apparatus 2*c*, the electromagnetic valves 20*c* and 22*c* are normally closed and the electromagnetic valve 23*c* is normally open. The apparatus 2*c* supplies moist air into the culture medium through a plurality of nozzles of the air feed tube 1*c* in the same way as the apparatus 2 in FIG. 3 does. However, when the moist air supplied alone is not sufficient for the turf due to dry surroundings, the valve 23*c* is closed and the supply of moist air is suspended. The valve 20*c* is then caused to open. Water 5*c* within the moistening tank 4*c* is caused to pass through the connecting tube 19*c* and then the air feed tube 1*c* and is supplied to the culture medium through a plurality of nozzles under the action of the highly pressurized air within the high pressure mixing chamber 6*c*. When the water within the moistening tank 4*c* is supplied in a certain fixed quantity, for example, from water level L1 to water level L2, the valve 22*c* is caused to open and water is supplied through the water supply tube 21*c* into the moistening tank 4*c*. Simultaneously, the valve 20*c* is closed and the water supply to the culture medium is suspended. Then, the valve 23*c* is caused to open and the moist air is again supplied as before. When the level of the water supplied into the moistening tank 4*c* is elevated to the original position L1, the valve 22*c* is closed and the water supply is suspended. In the course of moist air supply process, the water supply is automatically repeated at intervals of required time.

Reference is made to the automatic change-over system mentioned above. An example of this system is provided with a timer, an electric device for detecting the level of water lowered and a device for detecting the level of water raised.

The timer is used for opening the electromagnetic valve 20*c* at intervals of the required time and for closing the electromagnetic valve 23*c*. The device for detecting the level of water lowered is for detecting the level of the water lowered to L2 within the moistening tank and for closing the electromagnetic valve 20*c* and opening electromagnetic valves 22*c* and 23*c* by an electric signal generated from such detection. The device for detecting the level of the water raised is for detecting the level of water raised to L1 and closing the electromagnetic valve 22*c* by an electric signal generated from the relevant detection.

I claim:

1. An apparatus for growing organisms by moist air comprising a ventilative culture medium for growing organisms, an air feed tube having a plurality of nozzles buried in said culture medium, and a moist air generating apparatus connected with one end of said air feed tube, said air generating apparatus including a closed moistening tank having water therein, a closed high pressure mixing chamber defined in said tank on the surface of the water, an air bubble releasing means provided at a lower part of said moistening tank for releasing air bubbles into the water, and a moist air outlet provided on the top of said high pressure mixing chamber and connected with said one end of said air feed tube.

2. The apparatus for growing organisms by moist air according to claim 1 wherein said organisms are plants allowed to grow on said culture medium and extend roots into said culture medium.

3. The apparatus for growing organisms by moist air according to claim 1 further comprising a growing container containing said culture medium and a substantial portion of said air feed tube, and wherein said culture medium is sand placed within the growing container and said organisms are benthoses released into the sand.

4. The apparatus for growing organisms by moist air according to either one of claims 2 or 3 further comprising means for heating or cooling the water within said moistening tank.

5. An apparatus for growing organisms by moist air comprising a ventilative culture medium for growing organisms, an air feed tube having a plurality of nozzles buried in said culture medium, and a moist air generating apparatus connected with one end of said air feed tube, said air generating apparatus including a closed moistening tank having water therein, a closed high pressure mixing chamber defined in said tank on the surface of the water, an air bubble releasing means provided at a lower part of said moistening tank for releasing air bubbles into the water, a moist air outlet provided on the top of said high pressure mixing chamber, a first valve at said moist air outlet connected with said one end of said air feed tube, a water outlet provided on the lower part of said moistening tank, a second valve at said water outlet connected with said one end of said air feed tube, a third valve connected to said moistening tank, and means, connected by way of said third valve with said moistening tank, for supplying water into said moistening tank.

* * * * *